US006872939B2

(12) United States Patent
Bateman et al.

(10) Patent No.: US 6,872,939 B2
(45) Date of Patent: Mar. 29, 2005

(54) MASS SPECTROMETER

(75) Inventors: Robert Harold Bateman, Knutsford (GB); John Brian Hoyes, Stockport (GB); Jason Lee Wildgoose, Stockport (GB)

(73) Assignee: Micromass UK Limited, Manchester (GB)

( * ) Notice: Subject to any disclaimer, the term of this patent is extended or adjusted under 35 U.S.C. 154(b) by 0 days.

(21) Appl. No.: 10/439,225

(22) Filed: May 16, 2003

(65) Prior Publication Data

US 2004/0021070 A1 Feb. 5, 2004

Related U.S. Application Data

(60) Provisional application No. 60/422,136, filed on Oct. 30, 2002.

(30) Foreign Application Priority Data

May 31, 2002 (GB) .............................................. 0212641
May 17, 2002 (GB) .............................................. 0211373

(51) Int. Cl.[7] .......................... H01J 49/00; B01D 59/44
(52) U.S. Cl. ........................ 250/288; 250/282; 250/292
(58) Field of Search ................................ 250/282, 288, 250/292

(56) References Cited

U.S. PATENT DOCUMENTS

| | | | | |
|---|---|---|---|---|
| 5,905,258 A | * | 5/1999 | Clemmer et al. | 250/287 |
| 6,020,586 A | | 2/2000 | Dresch et al. | |
| 6,525,312 B1 | | 2/2003 | Cousins | |
| 6,627,883 B2 | * | 9/2003 | Wang et al. | 250/292 |
| 6,720,554 B2 | | 4/2004 | Hager | |
| 2002/0024010 A1 | | 2/2002 | Hager | |
| 2003/0168589 A1 | | 9/2003 | Hager | |

FOREIGN PATENT DOCUMENTS

| | | |
|---|---|---|
| WO | WO 00/33350 | 6/2000 |
| WO | WO 01/15201 | 3/2001 |
| WO | WO 02/48699 | 6/2002 |

* cited by examiner

*Primary Examiner*—John R. Lee
*Assistant Examiner*—Paul M. Gurzo
(74) *Attorney, Agent, or Firm*—Diederiks & Whitelaw, PLC

(57) ABSTRACT

A mass spectrometer includes an ion detector positioned upstream of a quadrupole mass filter/analyser. Ions are passed through the quadrupole mass filter/analyser, stored in an ion trap and then passed back through the same mass filter/analyser before being detected by the upstream ion detector. With this arrangement, MS/MS experiments can be performed using an apparatus having only a single mass filter/analyser.

54 Claims, 5 Drawing Sheets

MASS SPECTROMETER

CROSS-REFERENCE TO RELATED APPLICATIONS

This application claims the benefit of the filing of U.S. Provisional Patent Application Ser. No. 60/422,136 filed Oct. 30, 2002.

BACKGROUND OF THE INVENTION

1. Field of the Invention

The present invention relates to a mass spectrometer and a method of mass spectrometry.

2. Discussion of the Prior Art

Mass spectrometers are known which are suitable for performing so called MS/MS experiments wherein in a first step parent ions are mass analysed. In a second step parent ions having a particular mass to charge ratio are selected by a mass filter and are then fragmented in a gas collision cell. The resulting fragment ions are then mass analysed. The mass spectrum of an analyte ion and the mass spectrum of the fragment products of the analyte ion reveal useful information about the structure of the analyte ion and this information may then be used to identify the ion.

It is known to perform MS/MS experiments on triple quadrupole mass spectrometers. Triple quadrupole mass spectrometers comprise a first quadrupole mass filter Q1, followed by a quadrupole ion guide arranged in a gas collision cell Q2. Downstream of the gas collision cell Q2 is provided a second quadrupole mass analyser Q3.

A parent ion mass spectrum may be obtained by setting Q1 to operate in a wide band pass mode (i.e. RF only mode) so that the first quadrupole Q1 operates in non-filtering ion guide mode. The ions then pass through the gas collision cell Q2 but either collision gas is not provided in the collision cell or the energy of the ions passing through the collision cell is arranged to be sufficiently low so that ions are not substantially fragmented within the collision cell. The parent ions are then mass analysed by the second quadrupole mass analyser Q3.

A fragment ion or MS/MS mass spectrum may be obtained by setting the first quadrupole Q1 to operate as a mass filter so that only parent ions having a specific mass to charge ratio are onwardly transmitted by the mass filter. Parent ions transmitted by the mass filter Q1 then enter the collision cell Q2 and are arranged to have an energy such that they fragment upon colliding with gas molecules in the collision cell. The resultant fragment ions are then mass analysed by the second quadrupole mass analyser Q3.

Hybrid mass spectrometers wherein the second quadrupole mass analyser Q3 is replaced with a Time of Flight mass analyser are also known.

It is a feature of both the known triple quadrupole mass spectrometer and hybrid quadrupole-Time of Flight mass spectrometers that two mass filters/analysers are required in order to perform MS/MS experiments.

It is desired to provide an improved mass spectrometer for performing MS/MS experiments.

SUMMARY OF THE INVENTION

According to an aspect of the present invention there is provided a mass spectrometer comprising:

an ion source;

a mass filter/analyser arranged downstream of the ion source;

an upstream ion detector arranged upstream of the mass filter/mass analyser; and a downstream ion trap arranged downstream of the mass filter/analyser.

According to a particularly preferred feature MS/MS experiments may be performed using a mass spectrometer which comprises only a single mass filter/analyser. This represents a considerable simplification and cost saving over conventional arrangements such as triple quadrupole mass spectrometers and quadrupole-Time of Flight mass spectrometers wherein two mass filters/analysers are required. The present invention therefore constitutes an important advance in the art.

In order to use only one mass filter/analyser rather than two mass filters/analysers as is conventional, ions are preferably stored in an ion trap downstream of a mass filter/analyser and are then sent back upstream through the mass filter/analyser. The ions, which may comprise parent ions, fragment ions or second (or further) generation fragment ions may be mass filtered or mass analysed as they pass upstream through the mass filter/analyser. Alternatively/additionally, once the ions have been passed back upstream through the mass filter/analyser and stored in an upstream ion trap, the ions may then be passed back downstream through the mass filter/analyser to be mass filtered/analysed for a second, third or further time.

A number of distinct embodiments of the present invention are contemplated.

According to a first embodiment in a first mode of operation the mass filter is operated in a wide band pass mode so as to transmit substantially all ions and the downstream ion trap is arranged to accumulate parent ions. The ion source remains ON during this mode of operation.

In a second mode of operation the downstream ion trap releases the parent ions and at least some of the parent ions are passed back upstream through the mass filter/analyser which is arranged to mass analyse the parent ions. The ions are then detected by the upstream ion detector. In this mode of operation the ion source is switched OFF.

In a third mode of operation the mass filter/analyser is arranged to mass filter parent ions emitted from the ion source so that only parent ions having a specific mass to charge ratio are onwardly transmitted and ions having other mass to charge ratios are substantially attenuated by the mass filter. Ions onwardly transmitted by the mass filter are then arranged to be substantially fragmented. The resulting fragment ions are arranged to be accumulated in the downstream ion trap. The ion source in this mode of operation remains ON and the ions are preferably fragmented within the downstream ion trap.

In a fourth mode of operation the downstream ion trap releases the fragment ions and at least some of the fragment ions are passed back upstream through the mass filter/analyser which is arranged to mass analyse the fragment ions. The fragment ions are then detected by the upstream ion detector. In this mode of operation the ion source is switched OFF.

According to an alternative Single (or Selected) Reaction Monitoring ("SPM") embodiment the mass spectrometer may initially be operated in the second mode of operation described above so that selected parent ions are fragmented and the resultant fragment ions are stored in the downstream ion trap. Then, the downstream ion trap is arranged to release the fragment ions and at least some of the fragment ions are passed back upstream through the mass filter/analyser which is arranged to mass filter the fragment ions so that fragment ions having a specific mass to charge ratio are onwardly transmitted and fragment ions having other mass to charge ratios are attenuated by the mass filter. The fragment ions transmitted by the mass filter are detected by the upstream ion detector. When the fragment ions are released from the downstream ion trap the ion source is switched OFF. A Multiple Reaction Monitoring ("MRM") embodiment is also contemplated wherein either the transmission window of the mass filter when filtering parent ions and/or when filtering fragment ions is changed so that a different reaction is monitored for.

A second embodiment of the present invention is contemplated and further comprises a downstream ion detector arranged downstream of the downstream ion trap.

According to a first mode of operation of the second embodiment, the mass filter/analyser is arranged to mass analyse ions emitted from the ion source and the parent ions are detected by the downstream ion detector. The ion source is ON and the downstream ion trap is preferably arranged to be operated in a non-trapping ion guide mode of operation.

In a second mode of operation the mass filter/analyser is arranged to mass filter parent ions emitted from the ion source so that parent ions having a specific mass to charge ratio are onwardly transmitted and ions having other mass to charge ratios are attenuated by the mass filter. The ions onwardly transmitted by the mass filter are arranged to be substantially fragmented and fragment ions are arranged to be accumulated in the downstream ion trap. The ion source remains ON and ions are preferably fragmented within the downstream ion trap.

In a third mode of operation the downstream ion trap releases the fragment ions and at least some of the fragment ions are passed back upstream through the mass filter/analyser which is arranged to mass analyse the fragment ions. The fragment ions are then detected by the upstream ion detector. In this mode the ion source is switched OFF and the downstream ion trap is preferably operated in a non-trapping ion guide mode. Single Reaction Monitoring and Multiple Reaction Monitoring embodiments are also contemplated wherein the mass filter/analyser mass filters the fragment ions rather than mass analysing them i.e. the mass filter/analyser is set to transmit ions having a specific mass to charge ratio rather than being scanned.

According to a third embodiment of the present invention there is provided a mass spectrometer comprising;

an ion source;

a mass filter/analyser;

an upstream ion trap arranged upstream of the mass filter/analyser;

a downstream ion trap arranged downstream of the mass filter/analyser; and a downstream ion detector arranged downstream of the downstream ion trap;

wherein the mass filter/analyser is arranged to mass filter ions emitted from the ion source so that ions having a specific mass to charge ratio are onwardly transmitted and ions having other mass to charge ratios are attenuated by the mass filter and wherein ions onwardly transmitted by the mass filter are arranged to be substantially fragmented and wherein the fragment ions are arranged to be accumulated in the downstream ion trap, wherein the downstream ion trap then releases the fragment ions and at least some of the fragment ions are passed back upstream through the mass filter/analyser which is operated in a wide band pass mode so as to transmit substantially all the fragment ions wherein the fragment ions are arranged to be accumulated in the upstream ion trap, wherein the upstream ion trap then releases the fragment ions and at least some of the fragment ions are passed through the mass filter/analyser which is arranged to mass analyse or mass filter the fragment ions and wherein the fragment ions are transmitted by the downstream ion trap without the ions being substantially fragmented and are then detected by the downstream ion detector.

Single Reaction Monitoring and Multiple Reaction Monitoring embodiments are contemplated wherein the mass filter/analyser mass filters the fragment ions rather than mass analysing them i.e. the mass filter/analyser is set to transmit ions having a specific mass to charge ratio rather than being scanned.

A fourth embodiment is contemplated which is similar to the second embodiment except that an upstream ion trap is arranged upstream of the mass filter/analyser.

According to a first mode of operation of the fourth embodiment the mass filter/analyser is arranged to mass analyse parent ions emitted from the ion source and wherein the ions are detected by the downstream ion detector. The ion source is ON and preferably both the upstream ion trap and the downstream ion trap are operated in non-trapping ion guide modes.

In a second mode of operation the mass filter/analyser is arranged to mass filter ions emitted from the ion source so that ions having a specific mass to charge ratio are onwardly transmitted and ions having other mass to charge ratios are attenuated by the mass filter. The ions onwardly transmitted by the mass filter are arranged to be substantially fragmented and fragment ions are arranged to be accumulated in the downstream ion trap. In this mode the ion source remains ON and the upstream ion trap is operated in a non-trapping ion guide mode.

In a third mode of operation the downstream ion trap releases the fragment ions and wherein at least some of the fragment ions are passed back upstream through the mass filter/analyser which is arranged to mass analyse the fragment ions. The fragment ions are then detected by the upstream ion detector. In this mode the ion source preferably remains ON and the downstream ion trap is preferably operated in a non-trapping ion guide mode. Preferably, ions emitted from the ion source are substantially simultaneously accumulated in the upstream ion trap-whilst the fragment ions are being mass analysed.

Single Reaction Monitoring and Multiple Reaction Monitoring embodiments are also contemplated wherein the mass filter/analyser mass filters the fragment ions rather than mass analysing them i.e. the mass filter/analyser is set to transmit ions having a specific mass to charge ratio rather than being scanned.

In a fourth mode of operation the mass filter/analyser is arranged to mass filter ions emitted from the ion source so that ions having a specific mass to charge ratio are onwardly transmitted and ions having other mass to charge ratios are attenuated by the mass filter. Ions onwardly transmitted by the mass filter are arranged to be substantially fragmented and fragment ions are arranged to be accumulated in the downstream ion trap. In this mode the ion source remains ON and the upstream ion trap is operated in a non-trapping ion guide mode. Preferably, the mass filter/analyser also mass filters ions which have been accumulated in the upstream ion trap during the third mode of operation i.e. ions are released from the upstream ion trap.

In a fifth mode of operation the downstream ion trap releases the fragment ions and wherein at least some of the fragment ions are passed back upstream through the mass filter/analyser which is arranged to mass filter the fragment ions so that fragment ions having a specific mass to charge ratio are onwardly transmitted and fragment ions having other mass to charge ratios are attenuated by the mass filter. Fragment ions onwardly transimitted by the mass filter are arranged to be substantially further fragmented to form second generation fragment ions and the second generation fragment ions are arranged to be accumulated in the upstream ion trap. In this mode of operation the ion source is switched OFF and the downstream ion trap is operated in a non-trapping ion guide mode. The second generation fragment ions are preferably formed in the upstream.

In a sixth mode of operation the upstream ion trap is arranged to release the second generation fragment ions and the mass filter/analyser is arranged to mass analyse the second generation fragment ions. The second generation fragment ions are then detected by the downstream ion detector. In this mode of operation the ion source remains OFF and preferably both the upstream ion trap and the downstream ion trap are operated in non-trapping ion guide modes.

Single Reaction Monitoring and Multiple Reaction Monitoring embodiments are also contemplated wherein the mass filter/analyser mass filters the second generation fragment ions rather than mass analysing them i.e. the mass filter/analyser is set to transmit second generation fragment ions having a specific mass to charge ratio rather than being scanned.

A fifth embodiment of the present invention is contemplated. This embodiment is similar to the fourth embodiment except that a second upstream ion trap is arranged upstream of the (first) upstream ion trap. According to the fifth embodiment the ion source preferably remains permanently ON so that ions are trapped within the second upstream ion trap whilst the equivalent of the fifth and sixth modes of operation of the fourth embodiment are performed. Accordingly, according to a mode of operation the downstream ion trap may release fragment ions and at least some of the fragment ions are passed back upstream through the mass filter/analyser which is arranged to mass filter the fragment ions so that fragment ions having a specific mass to charge ratio are onwardly transmitted and fragment ions having other mass to charge ratios are attenuated by the mass filter. Fragment ions onwardly transmitted by the mass filter are arranged to be substantially further fragmented to form second generation fragment ions and wherein the second generation fragment ions are arranged to be accumulated in the upstream ion trap. Ions emitted from the ion source are substantially simultaneously accumulated in the second upstream ion trap whilst the fragment ions are being mass filtered by the mass filter.

Similarly, in another mode of operation, the upstream ion trap is arranged to release the second generation fragment ions and the mass filter/analyser is arranged to mass analyse the second generation fragment ions. The second generation fragment ions are detected by the downstream ion detector and ions emitted from the ion source are substantially simultaneously accumulated in the second upstream ion trap whilst the second generation fragment ions are being mass analysed by the mass analyser.

Single Reaction Monitoring and Multiple Reaction Monitoring embodiments are also contemplated wherein the mass filter/analyser mass filters the second generation fragment ions rather than mass analysing them i.e. the mass filter/analyser is set to transmit second generation fragment ions having a specific mass to charge ratio rather than being scanned.

The following preferred features relate to all five embodiments detailed above.

The ion source may comprise an Electrospray ("ESI") ion source, an Atmospheric Pressure Chemical Ionisation ("APCI") ion source, an Atmospheric Pressure Photo Ionisation ("APPI") ion source, a Matrix Assisted Laser Desorption Ionisation ("MALDI") ion source, a Laser Desorption Ionisation ("LDI") ion source, an Inductively Coupled Plasma ("ICP") ion source, an Electron Impact ("EI") ion source, a Chemical Ionisation ("CI") ion source, a Fast Atom Bombardment ("FAB") ion source, or a Liquid Secondary Ions Mass Spectrometry ("LSIMS") ion source.

When ions are arranged to be fragmented in either the downstream ion trap and/or the upstream ion trap preferably at least 50%, 60%, 70%, 80%, 90% or 95% of the ions enter either the downstream ion trap and/or the upstream ion trap with an energy greater than or equal to 10 eV for a singly charged ion or greater than or equal to 20 eV for a doubly charged ion so that the ions are caused to fragment.

Preferably, the downstream ion trap and/or the upstream ion trap and/or the second upstream ion trap are maintained in use at a pressure selected from the group consisting of: (i) greater than or equal to 0.0001 mbar; (ii) greater than or equal to 0.0005 mbar; (iii) greater than or equal to 0.001 mbar; (iv) greater than or equal to 0.005 mbar; (v) greater than or equal to 0.01 mbar; (vi) greater than or equal to 0.05 mbar; (vii) greater than or equal to 0.1 mbar; (viii) greater than or equal to 0.5 mbar; (ix) greater than or equal to 1 mbar; (X) greater than or equal to 5 mbar; and (xi) greater than or equal to 10 mbar.

Preferably, the downstream ion trap and/or the upstream ion trap and/or the second upstream ion trap is maintained in use at a pressure selected from the group consisting of: (i) less than or equal to 10 mbar; (ii) less than or equal to 5 mbar; (iii) less than or equal to 1 mbar; (iv) less than or equal to 0.5 mbar; (v) less than or equal to 0.1 mbar; (vi) less than or equal to 0.05 mbar; (vii) less than or equal to 0.01 mbar; (viii) less than or equal to 0.005 mbar; (ix) less than or equal to 0.001 mbar; (x) less than or equal to 0.0005 mbar; and (xi) less than or equal to 0.0001 mbar.

Preferably, the downstream ion trap and/or the upstream ion trap and/or the second upstream ion trap is maintained in use at a pressure selected from the group consisting of: (i) between 0.0001 and 10 mbar; (ii) between 0.0001 and 1 mbar; (iii) between 0.0001 and 0.1 mbar; (iv) between 0.0001 and 0.01 mbar; (v) between 0.0001 and 0.001 mbar; (vi) between 0.001 and 10 mbar; (vii) between 0.001 and 1 mbar; (viii) between 0.001 and 0.1 mbar; (ix) between 0.001 and 0.01 mbar; (x) between 0.01 and 10 mbar; (xi) between 0.01 and 1 mbar; (xii) between 0.01 and 0.1 mbar; (xiii) between 0.1 and 10 mbar; (xiv) between 0.1 and 1 mbar; and (xv) between 1 and 10 mbar.

The upstream and downstream ion traps preferably comprise ion tunnel devices consisting of a set of rings having alternating polarities of RF voltage applied to them. The ion tunnel ion traps may in one mode of operation act as ion guides (i.e. do not actually trap ions) and offer various advantages compared to conventional multipole rod set ion guides. Each ring within the ion tunnel device may be connected independently allowing these devices to be operated as ion traps, ion mobility separators, collisionless drift tubes and collision cells for fragmenting ions. In addition, they may also act as continuous ion guides between areas of differing pressures since one of the rings of the ion tunnel may act as a differential pumping aperture thereby improving ion transmission from one region to another.

The downstream ion trap and/or the upstream ion trap and/or the second upstream ion trap may comprise an ion funnel comprising a plurality of electrodes having apertures therein through which ions are transmitted, wherein the diameter of the apertures becomes progressively smaller or larger. Alternatively, they may comprise an ion tunnel comprising a plurality of electrodes having apertures therein through which ions are transmitted, wherein the diameter of the apertures retains substantially constant. They may also comprise a stack of plate, ring or wire loop electrodes.

Preferably, the downstream ion trap and/or the upstream ion trap and/or the second upstream ion trap comprise a plurality of electrodes, each electrode having an aperture through which ions are transmitted in use. Each electrode preferably has a substantially circular aperture although the apertures may take on other shapes according to less preferred embodiments.

Preferably, the diameter of the apertures of at least 50%, 60%, 70%, 80%, 90% or 95% of the electrodes forming the downstream ion trap and/or the upstream ion trap and/or the second upstream ion trap are selected from the group consisting of: (i) less than or equal to 10 mm; (ii) less than or equal to 9 mm; (iii) less than or equal to 8 mm; (iv) less than or equal to 7 mm; (v) less than or equal to 6 mm; (vi) less than or equal to 5 mm; (vii) less than or equal to 4 mm; (viii) less than or equal to 3 mm; (ix), less than or equal to 2 mm; and (x) less than or equal to 1 mm.

Preferably, at least 50%, 60%, 70%, 80%, 90% or 95% of the electrodes forming the downstream ion trap and/or the upstream ion trap and/or the second upstream ion trap have apertures which are substantially the same size or area.

Preferably, the thickness of at least 50%, 60%, 70%, 80%, 90% or 95% of the electrodes are selected from the group consisting of: (i) less than or equal to 3 mm; (ii) less than or equal to 2.5 mm; (iii) less than or equal to 2.0 mm; (iv) less than or equal to 1.5 mm; (v) less than or equal to 1.0 mm; and (vi) less than or equal to 0.5 mm.

Preferably, the downstream ion trap and/or the upstream ion trap and/or the second upstream ion trap consist of: (i) 10–20 electrodes; (ii) 20–30 electrodes; (iii) 30–40 electrodes; (iv) 40–50 electrodes; (v) 50–60 electrodes; (vi) 60–70 electrodes; (vii) 70–80 electrodes; (viii) 80–90 electrodes; (ix) 90–100 electrodes; (x) 100–110 electrodes; (xi) 110–120 electrodes; (xii) 120–130 electrodes; (xiii) 130–140 electrodes; (xiv) 140–150 electrodes; or (xv) more than 150 electrodes.

Preferably, the downstream ion trap and/or the upstream ion trap and/or the second upstream ion trap has a length selected from the group consisting of: (i) less than 5 cm; (ii) 5–10 cm; (iii) 10–15 cm; (iv) 15–20 cm; (v) 20–25 cm; (vi) 25–30 cm; and (vii) greater than 30 cm. Preferably, at least 10%, 20%, 30%, 40%, 50%, 60%, 70%, 80%, 90%, or 95% of the electrodes are connected to both a DC and an AC or RF voltage supply. Preferably, axially adjacent electrodes are supplied with AC or RF voltages having a phase difference of 180°.

According to an alternative embodiment the downstream ion trap and/or the upstream ion trap and/or the second upstream ion trap may comprise a segmented rod set. Embodiments are also contemplated wherein, for example, one ion trap may comprise a plurality of electrodes having apertures and another ion trap may comprise a segmented rod set.

Preferably, the downstream ion trap and/or the upstream ion trap and/or the second upstream ion trap comprise a housing having an upstream opening for allowing ions to enter the ion trap and a downstream opening for allowing ions to exit the ion trap.

Preferably, the downstream ion trap and/or the upstream ion trap and/or the second upstream ion trap further comprise an inlet port through which a collision gas is introduced. A collision gas such as air and/or one or more inert gases and/or one or more non-inert gases is preferably introduced into the housing via the inlet port.

The upstream ion detector and/or the downstream ion detector preferably comprise a single detector or a detector array providing spatial information. The detector may comprise a Micro Channel Plate detector, an electron-multiplier detector or a phosphor or scintillator in conjunction with a photo-multiplier detector.

The downstream ion detector and/or the upstream ion detector may, less preferably, form part of a further mass analyser such as a Time of Flight mass analyser, a quadrupole mass analyser, a Penning or Fourier Transform Ion Cyclotron Resonance ("FTICR") mass analyser, a 2D or linear quadrupole ion trap or a Paul or 3D quadrupole ion trap.

According to the preferred embodiment the downstream ion trap and/or the upstream ion trap and/or the second upstream ion trap may be operated in one of more of the following modes: (i) an ion trapping mode wherein one or more trapping voltages are applied to prevent ions from exiting from one or more ends of the ion trap; (ii) an ion guide mode wherein no trapping voltages are applied and hence all ions received by the ion trap are substantially onwardly transmitted by the ion trap; (iii) a fragmentation mode wherein the ion trap is arranged to be maintained at a pressure and/or ions are arranged to enter the ion trap with an energy such that the ions are substantially fragmented within the ion trap; and (iv) an ion trapping and fragmentation mode wherein one or more trapping voltages are applied to prevent ions from exiting from one or more ends of the ion trap and wherein the ion trap is arranged to be maintained at a pressure and/or ions are arranged to enter the ion trap with an energy such that the ions are substantially fragmented within the ion trap. In the ion guide mode an axial DC voltage gradient may be applied or maintained along at least a portion of the ion trap so that ions are accelerated out or through the ion trap.

The mass filter/analyser preferably comprises a quadrupole rod set mass filter/analyser. According to less preferred embodiments the mass filter/analyser may comprise a magnetic sector mass analyser, or a Time of Flight mass analyser.

According to another aspect of the present invention there is provided a method of mass spectrometry, comprising:

providing an ion source, a mass filter/analyser arranged downstream of the ion source, an upstream ion detector arranged upstream of the mass filter/mass analyser and a downstream ion trap arranged downstream of the mass filter/analyser;

trapping parent or fragment ions in the downstream ion trap;

ejecting the parent or fragment ions from the downstream ion trap and passing the parent or fragment ions through the mass filter/analyser;

mass analysing or mass filtering the parent or fragment ions; and detecting the ions with the upstream ion detector.

Preferably, the method further comprises trapping ions generated from the ion source in an upstream ion trap whilst fragment ions are being mass analysed.

According to another aspect of the present invention there is provided a method-of mass spectrometry, comprising:

providing an ion source, a mass filter/analyser arranged downstream of the ion source, an upstream ion detector arranged upstream of the mass filter/mass analyser, an upstream ion trap arranged upstream of the mass filter/analyser, a second upstream ion trap arranged upstream of the upstream ion trap and a downstream ion trap arranged downstream of the mass filter/analyser;

trapping fragment ions in the downstream ion trap;

ejecting the fragment ions from the downstream ion trap and passing the fragment ions through the mass filter/analyser;

mass filtering the fragment ions so that fragment ions having a specific mass to charge ratio are onwardly transmitted and ions having other mass to charge ratios are attenuated by the mass filter;

further fragmenting the fragment ions onwardly transmitted by the mass filter to form second generation fragment ions; and accumulating the second generation fragment ions in the upstream ion trap.

Preferably, the method further comprises trapping ions generated from the ion source in the second upstream ion trap whilst fragment,ions are being mass filtered.

Preferably, the method further comprises:

ejecting the second generation fragment ions from the upstream ion trap and passing the second generation fragment ions through the mass filter/analyser;

mass analysing or mass filtering the second generation fragment ions; and detecting the ions with the downstream ion detector.

Preferably, the method further comprises trapping ions generated from the ion source in the second upstream ion trap whilst the second generation fragment ions are being mass analysed.

According to another aspect of the present invention there is provided a method of mass spectrometry, comprising:

providing an ion source, a mass filter/analyser arranged downstream of the ion source, an upstream ion detector arranged upstream of the mass filter/mass analyser and a downstream ion trap arranged downstream of the mass filter/analyser;

trapping fragment ions in the downstream ion trap;

ejecting the fragment ions from the downstream ion trap and passing the fragment ions through the mass filter/analyser;

mass filtering the fragment ions so that fragment ions having a specific mass to charge ratio are onwardly transmitted and ions having other mass to charge ratios are attenuated by the mass filter; and detecting the ions with the upstream ion detector.

According to another aspect of the present invention there is provided a method of mass spectrometry, comprising:

providing an ion source, a mass filter/analyser arranged downstream of the ion source, an upstream ion trap arranged upstream of the mass filter/mass analyser, a downstream ion trap arranged downstream of the mass filter/analyser, and a downstream ion detector arranged downstream of the downstream ion trap;

arranging the mass filter/analyser to mass filter ions emitted from the ion source so that ions having a specific mass to charge ratio are onwardly transmitted and ions having other mass to charge ratios are attenuated by the mass filter;

fragmenting the ions onwardly transmitted by the mass filter;

accumulating the fragment ions in the downstream ion trap;

releasing the fragment ions from the downstream ion trap;

passing at least some of the fragment ions back upstream through the mass filter/analyser which is operated in a wide band pass mode so as to transmit substantially all the fragment ions wherein the fragment ions are arranged to be accumulated in the upstream ion trap;

releasing the fragment ions from the upstream ion trap;

passing at least some of the fragment ions through the mass filter/analyser which is arranged to mass analyse or mass filter the fragment ions;

transmitting the fragment ions through the downstream ion trap without the fragment ions being substantially further fragmented; and detecting the ions with the downstream ion detector.

In the above embodiments various modes of operation are described as being first, second, third . . . etc. modes of operation. However, it should be understood that not all of the modes of operation have to be performed and at least some of the modes of operation may be performed in different orders.

Reference is also made in the claims to various components of the mass spectrometer being either "upstream" or "downstream" from one another. For the avoidance of any doubt it should be understood that such terms should be construed to mean that components are either physically located and/or functionally provided upstream or downstream of one another. For example, when reference is made to an ion detector arranged upstream of a mass filter/analyser then it should be understood that ions pass back through the mass filter/analyser and exit the mass filter/analyser from what would normally be regarded as the entrance region of the mass filter/analyser. In a conventional triple quadrupole mass spectrometer or a hybrid quadrupole-Time of Flight mass spectrometer the second mass analyser Q3 or the Time of Flight mass analyser and the ion detector associated with such mass analyser is provided downstream not upstream of the first mass filter/analyser Q1.

According to another aspect of the present invention there is provided a method of mass spectrometry comprising sending ions an even number of times through the same mass filter/analyser before said ions are detected by an ion detector.

Ions are preferably passed twice, four times, six times, eight times or ten times through the same mass filter/analyser and are not passed an odd number of times through the mass filter/analyser before said ions are detected by an ion detector.

This embodiment is in contrast to arrangements wherein ions pass an odd number of times through the same mass filter/analyser.

BRIEF DESCRIPTION OF THE DRAWINGS

Various embodiments of the present invention will now be described, by way of example only, and with reference to the accompanying drawings in which.

DETAILED DESCRIPTION OF THE PREFERRED EMBODIMENTS

Various embodiments of the present invention will now be discussed in relation to FIGS. 1A–1E.

Figure 1A:
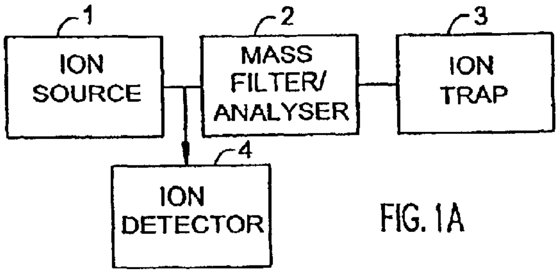
FIG. 1A illustrates a first embodiment of the present invention for performing MS/MS and SRM experiments.

FIG. 1A illustrates a first embodiment of the present invention. According to this embodiment an ion source 1 is provided. Downstream of the ion source 1 is provided a mass filter/analyser 2 and downstream of the mass filter/analyser 2 is provided a downstream ion trap 3. Upstream of the mass filter/analyser 2 is provided an upstream ion detector 4. As shown in more detail in FIGS. 2A–2D this embodiment can advantageously perform a MS/MS experiment using apparatus comprising only a single mass filter/analyser 2 whereas conventional triple quadrupole mass spectrometers comprise two mass filters/analysers.

As shown in FIGS. 2A–2D according to the first embodiment four different modes of operation are cycled through in order to complete a MS/MS experiment. In the first mode shown in FIG. 2A the ion source 1 is ON, the mass filter/analyser 2 is set to transmit all ions irrespective of their mass to charge ratio (e.g. wide band pass mode or RF ion guide mode) and parent ions are trapped in the downstream ion trap 3. In the subsequent MS mode shown in FIG. 2B the ion source 1 is switched OFF, parent ions are released from the downstream ion trap 3 and pass upstream back through the mass analyser 2 which is scanned so that the parent ions are mass analysed and detected by the upstream ion detector 4. In the subsequent mode shown in FIG. 2C the ion source 1 is switched back ON, the mass filter 2 is arranged to operate in a narrow bandpass mode so that only parent ions falling within a specific narrow range of mass to charge ratios are transmitted by the mass filter 2. These parent ions are then arranged to have an energy and the downstream ion trap 3 is arranged to be maintained at a pressure such that when the parent ions enter the downstream ion trap 3 they are caused to fragment into fragment ions which are also trapped, accumulated or otherwise stored in downstream ion trap 3. In the final mode shown in FIG. 2D the ion source 1 is again switched OFF and the fragment ions are released from the downstream ion trap 3 and are arranged to pass back upstream through the mass analyser 2 which is arranged to be scanned so as to mass analyse the fragment ions which are then detected by upstream ion detector 4.

Figure 2A:
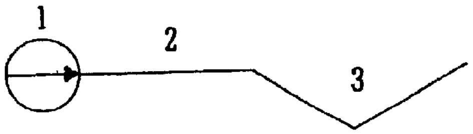
FIG. 2A illustrates a first mode of the first embodiment wherein parent ions are accumulated in an ion trap.
Figure 2B:
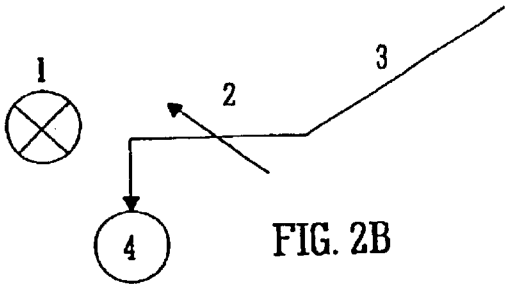
FIG. 2B illustrates a second mode wherein parent ions are released from the ion trap and are passed back through the mass analyser for mass analysis.
Figure 2C:
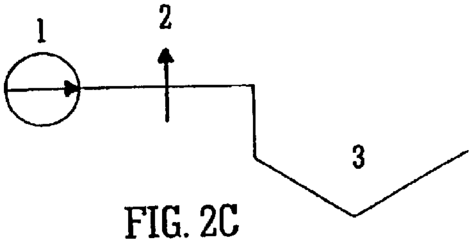
FIG. 2C illustrates a third mode wherein particular parent ions are selected, fragmented and stored in the ion trap
Figure 2D:
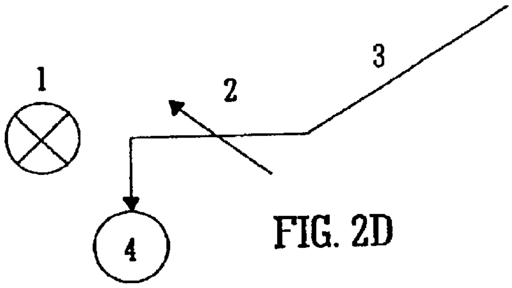
FIG. 2D illustrates a fourth mode wherein the fragment ions are passed back through the mass analyser for mass analysis.

Although not shown in FIG. 2D Single Reaction Monitoring and Multiple Reaction Monitoring embodiments are contemplated wherein the mass filter/analyser 2 mass filters the fragment ions rather than mass analysing them i.e. the mass filter/analyser 2 is get to transmit ions having a specific mass to charge ratio rather than being scanned.

It will be apparent from the above that in the second and fourth modes shown respectively in FIG. 2B and FIG. 2D the ion source 1 is turned OFF to allow the mass analyser 2 to analyse the previously accumulated ions. This prevents parent ions from the source which have not passed through the mass analyser 2 from appearing in the resulting mass spectra but has the disadvantage of lowering the overall duty cycle of the MS/MS experiment.

According to a preferred embodiment the mass filter/analyser 2 may comprise a quadrupole rod set mass filter. In a scanning experiment such as described above approximately equal times may be spent in each of the four different modes. Accordingly, the ion source 1 would be OFF for about 50% of the time hence 50% of the ions generated would be used.

Figure 3A:
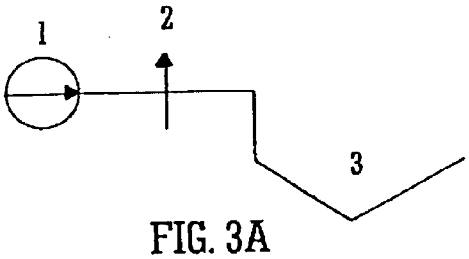
FIG. 3A illustrates a first mode of an alternative embodiment wherein particular parent ions are selected, fragmented and stored in an ion trap
Figure 3B:
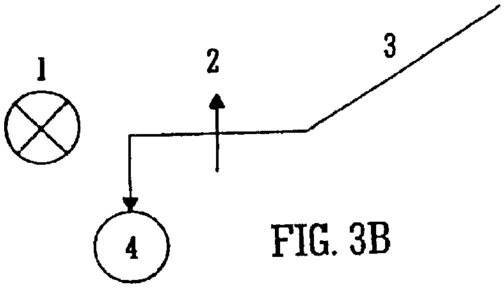
FIG. 3B illustrates a second mode wherein the fragment ions are passed back through the mass filter.

FIGS. 3A and 3B show a variation of the first embodiment for performing a Selected Reaction Monitoring (SRM) experiment. In a SRM experiment a known targeted compound is monitored. As shown in FIG. 3A for the majority of the time (e.g. 90% of the time) the ion source 1 can be left ON. The mass filter 2 is set to transmit only parent ions having a specific mass to charge ratio which corresponds with the targeted compound. Those parent ions transmitted by the mass filter 2 are then fragmented in the downstream ion trap 3 and are stored in the downstream ion trap 3. Accordingly, a majority of the time in any given experimental run can be spent accumulating fragment ions in the downstream ion trap 3 (i.e. the first mode shown in FIG. 3A). The ion source 1 is then switched OFF for a relatively short period of time whilst the fragment ions are caused to exit the downstream ion trap 3, pass back upstream through the mass filter 2 to the upstream ion detector 4. Advantageously, concentrating the desired ion signal in a relatively short portion of an experimental cycle enhances the signal to noise ratio compared with conventional arrangements wherein an ion detector is active for substantially the whole of an experimental run. It is contemplated that an amplifier may be phase locked to the waveform of the experimental cycle. Multiple Reaction Monitoring (MRM) experiments can also be performed by cycling through different mass to charge ratios and transitions.

Figure 1B:
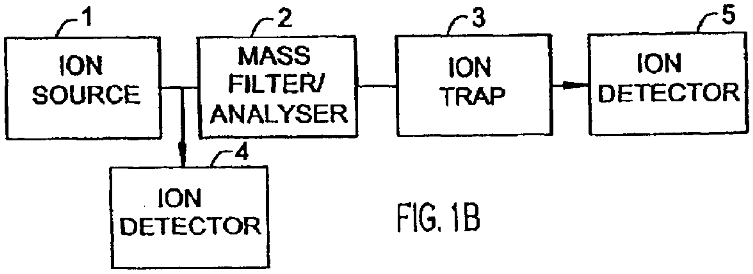
FIG. 1B illustrates a second embodiment of the present invention for performing MS/MS experiments.

FIG. 1B illustrates a second embodiment of the present invention. The second embodiment is similar to the first embodiment except that a downstream ion detector 5 is also provided downstream of the downstream ion trap 3. As shown in more detail in FIGS. 4A–4C the addition of a downstream ion detector 5 reduces the number of steps required for certain analyses. MS/MS experiments can be performed requiring one less step than in the first embodiment i.e. three steps as opposed to four. Furthermore, as is apparent from comparing FIGS. 4A–C with FIGS. 2A–D, the ion source 1 is OFF for only one out of the three modes of operation. The ion usage according to the second embodiment is therefore improved to 66% compared with 50% according to the first embodiment.

Figure 4A:
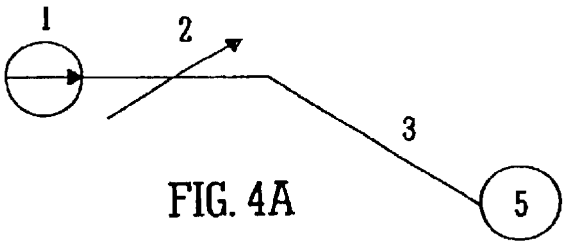
FIG. 4A illustrates a first mode of the second embodiment wherein parent ions are mass analysed.
Figure 4B:
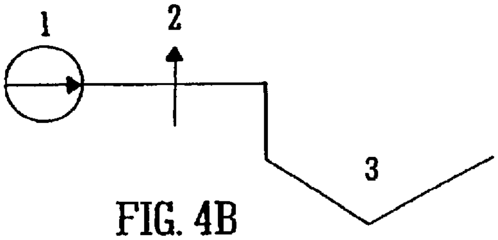
FIG. 4B illustrates a second mode wherein particular parent ions are selected, fragmented and stored in an ion trap.
Figure 4C:
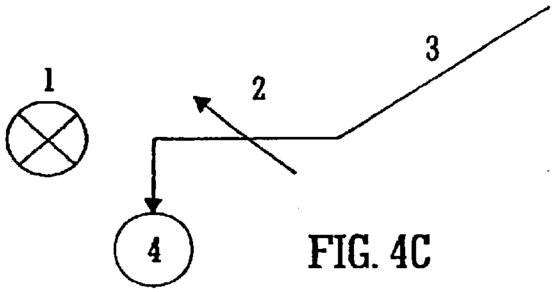
FIG. 4C illustrates a third mode wherein the fragment ions are passed back through the mass analyser for mass analysis.

As shown in FIGS. 4A–4C according to the second embodiment three different modes of operation are cycled through in order to complete a MS/MS experiment. In the first mode shown in FIG. 4A the ion source 1 is ON, the mass filter/analyser 2 is arranged to be scanned so as to mass analyse parent ions which are then detected by the downstream ion detector 5. The downstream ion trap 3 is arranged to operate as an ion guide. In the second mode shown in FIG. 4B the ion source is again ON, the mass filter 2 is arranged to operated in a narrow bandpass mode so that only parent ions falling within a specific narrow range of mass to charge ratios are transmitted by the mass filter 2. These parent ions are then arranged to have an energy and the downstream ion trap 3 is arranged to he maintained at a pressure such that when the parent ions enter the downstream ion trap 3 they are caused to fragment into fragment ions which are also trapped, accumulated or otherwise stored in downstream ion trap 3. In the third mode of operation shown in FIG. 4C the ion source 1 is switched OFF and the fragment ions are released from the downstream ion trap 3 and are arranged to pass back upstream through the mass analyser 2 which is arranged to be scanned so as to mass analyse the fragment ions which are then detected by upstream ion detector 4.

Although not shown in FIG. 4C Single Reaction Monitoring and Multiple Reaction Monitoring embodiments are contemplated wherein the mass filter/analyser 2 mass filters the fragment ions rather than mass analysing them i.e. the mass filter/analyser 2 is set to transmit ions having a specific mass to charge ratio rather than being scanned.

Figure 1C:
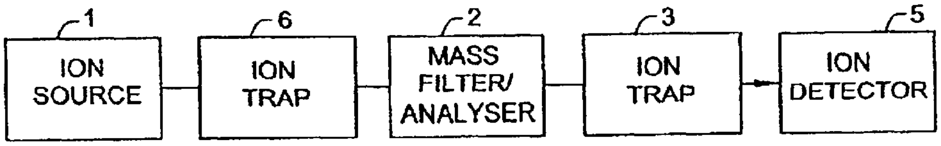
FIG. 1C illustrates a third embodiment of the present invention for performing MS/MS experiments.

FIG. 1C illustrates a third embodiment of the present intention. The third embodiment is similar to the second embodiment except that an upstream ion detector 4 is not necessarily required and an upstream ion trap 6 is provided upstream of the mass filter/analyser 2. As shown in more detail in FIGS. 5A–5D the addition of an upstream ion trap 6 without an upstream ion detector 4 allows $MS^n$ experiments to be performed wherein parent ions are selected, fragmented and then specific fragment ions may be selected and fragmented to form second generation fragment ions. This is possible because ions may be passed back and forth through the mass filter 2 as many times as desired. With no upstream ion detector 4 the ions preferably pass through the mass filter 2 an odd number of times for a particular experimental cycle. A typical experimental cycle for a MS/MS experiment is shown in FIGS. 5A–5D.

The downstream ion detector 5 may be replaced by an orthogonal acceleration Time of Flight mass analyser which can reduce the number of steps-required for any particular analysis in addition to improving the duty cycle.

As shown in FIGS. 5A–5D according to the third embodiment four different modes of operation may be cycled through in order to complete a MS/MS experiment. In the first mode shown in FIG. 5A the ion source 1 is ON, the upstream ion trap 6 acts as an ion guide and the mass filter/analyser 2 is arranged to be scanned. The ions transmitted by the mass analyser 2 are transmitted by the downstream ion trap 3 which is arranged to be operated as an ion guide and the ions are detected by downstream ion detector 5. In the second mode shown in FIG. 5B the ion source 1 remains ON, the upstream ion trap 6 is arranged to act as an ion guide and the mass filter/analyser 2 is arranged to act as a mass filter 2 so that only parent ions falling with a specific narrow range of mass to charge ratios are transmitted by the mass filter 2. These parent ions are then arranged to have an energy and the downstream ion trap 3 is arranged to be maintained at a pressure such that when the parent ions enter the downstream ion trap 3 they are caused to fragment into fragment ions which are also trapped, accumulated or otherwise stored in downstream ion trap 3. In the third mode shown in FIG. 5C the ion source 1 is switched OFF and the fragment ions are released from the downstream ion trap 3 and are arranged to pass back upstream through the mass filter/analyser 2 which is arranged to transmit all ions irrespective of their mass to charge ratio (i.e. it is operated in a wide band pass mode or RF ion guide mode). The fragment ions are then trapped in upstream ion trap 6. In the fourth mode shown in FIG. 5D the ion source 1 remains OFF and the fragment ions are released from the upstream ion trap 6 and are arranged to pass through the mass filter/analyser 2 which is arranged to be scanned so as to mass analyse the fragment ions. The fragment ions are then transmitted by the downstream ion trap 3 which is arranged to be operated as an ion guide and are detected by downstream ion detector 5.

Figure 5A:
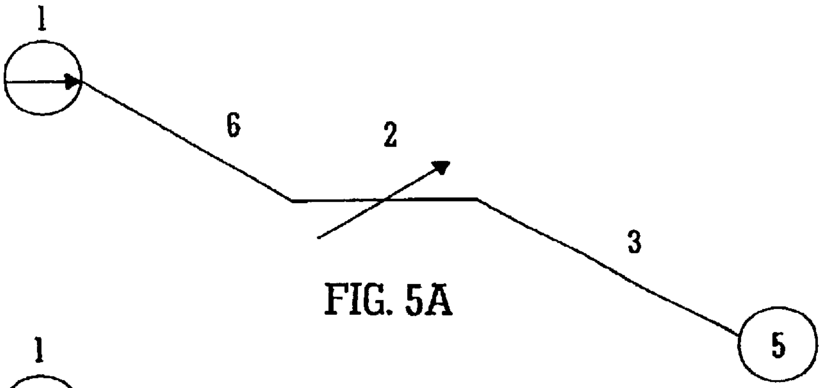
FIG. 5A illustrates a first mode of the third embodiment wherein parent ions are mass analysed.
Figure 5B:
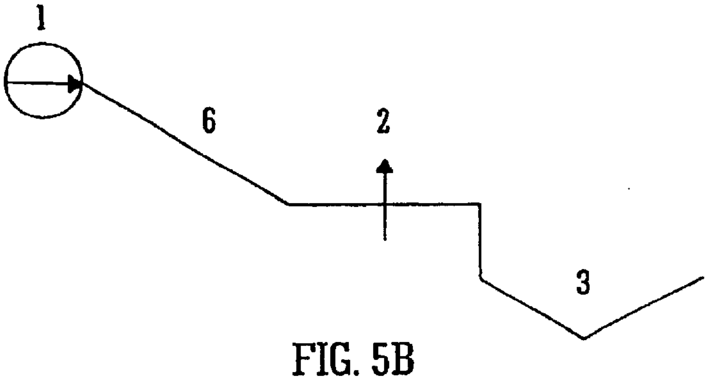
FIG. 5B illustrates a second mode wherein particular parent ions are selected, fragmented and stored in an ion trap.
Figure 5C:
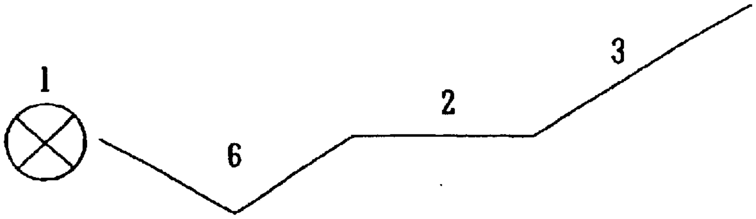
FIG. 5C illustrates a third mode wherein the fragment ions are passed back through the mass filter/analyser which is arranged to transmit all the fragment ions which are then stored in an upstream ion trap.
Figure 5D:
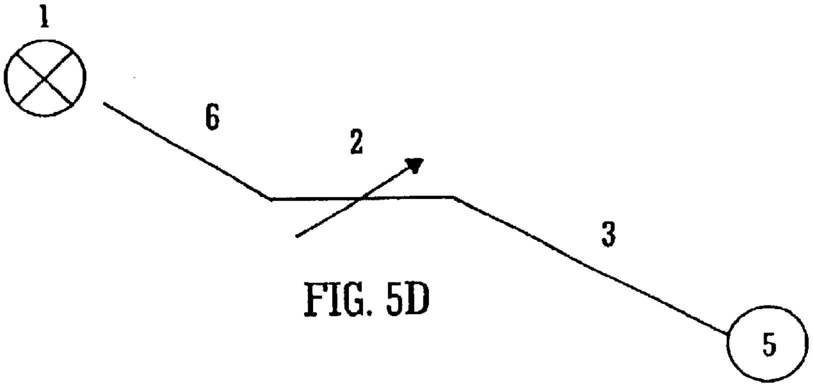
FIG. 5D illustrates a fourth mode wherein the fragment ions are passed back through the mass analyser for mass analysis.

Although not shown in FIG. 5D Single Reaction Monitoring and Multiple Reaction Monitoring embodiments are contemplated wherein the mass filter/analyser 2 mass filters the fragment ions rather than mass analysing them i.e. the mass filter/analyser 2 is set to transmit ions having a specific mass to charge ratio rather than being scanned.

Figure 1D:
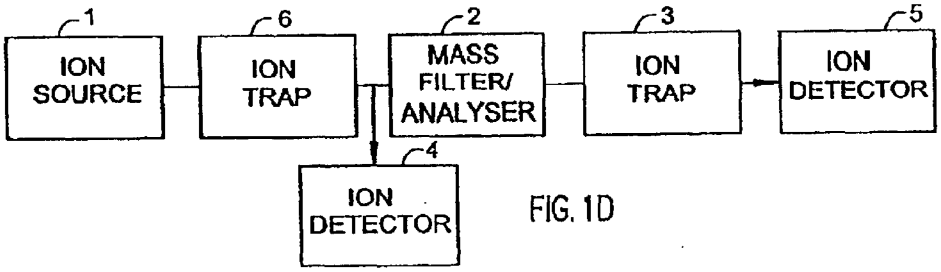
FIG. 1D illustrates a fourth embodiment of the present invention for performing $MS^3$ experiments and FIG. 1E illustrates a fifth embodiment of the present invention.

FIG. 1D illustrates a fourth embodiment of the present invention. This embodiment is similar to the third embodiment except that an upstream ion detector 4 is provided upstream of the mass filter 2 and downstream of the upstream ion trap 6. The combination of an upstream ion trap 6 and an upstream ion detector 4 enables the number of cycles required for an experiment to be reduced. The mass filter 2 may be configured to scan so that a full mass spectrum can be acquired. Alternatively, the mass filter 2 may select ions having a certain mass to charge ratio for monitoring or fragmentation. The mass filter 2 may also be switched to a wideband pass mode so that ions pass through the mass filter and are stored in an ion trap.

As shown in FIGS. 6A–6E according to the fourth embodiment a number of different modes of operation may be cycled through in order to complete a $MS^3$ experiment. In the first mode the ion source 1 is ON and the upstream ion trap 6 is set to act as an ion guide. The ions are pass through the mass filter/analyser 2 which is arranged to be scanned so as to mass analyse ions. The ions are then transmitted by a downstream ion trap 3 which is also arranged to act as an ion guide. The ions are then detected by a downstream ion detector 5. In the second mode the ion source 1 remains ON and the upstream ion trap 6 is again arranged to act as an ion guide. The mass filter 2 is arranged to transmit ions falling within a specific narrow range of mass to charge ratios. These parent ions are then arranged to have an energy and the downstream ion trap 3 is arranged to be maintained at a pressure such that when the parent ions enter the downstream ion trap 3 they are caused to fragment into fragment ions which are also trapped, accumulated or otherwise sorted in downstream ion trap 3. In the third mode the ion source 1 remains ON and ions generated by the ion source 1 are preferably trapped in the upstream ion trap 6. Meanwhile, fragment ions are caused to exit the downstream ion trap 3 and pass back upstream through the mass analyser 2 to the upstream ion detector 4. The mass analyser 2 is arranged to be scanned so as to mass analyse the fragment ions which are then detected by the upstream ion detector 4. According to the next mode ions from the upstream ion trap 6 are released and these ions together with other parent ions generated by the ion source 1 are transmitted by the upstream ion trap 6 which is set to operate as an ion guide. The mass filter 2 is arranged to transmit ions falling within a specific narrow range of mass to charge ratios. These parent ions are then arranged to have an energy and the downstream ion trap 3 is arranged to be maintained at a pressure such that when the parent ions enter the downstream ion trap 3 they are caused to fragment into fragment ions which are also trapped, accumulated or otherwise stored in downstream ion trap 3. According to the next mode shown and described in relation to FIG. 6D the ion source 1 is switched OFF and fragment ions are released from the downstream ion trap 3. The fragment ions are arranged to be passed back upstream through the mass filter 2 which is arranged to operate in a narrow bandpass mode so that only parent ions falling within a specific narrow range of mass to charge ratios are transmitted by the mass filter 2. The fragment ions are then arranged to have an energy and the upstream ion trap 6 is arranged to be maintained at a pressure such that when the fragment ions enter the upstream ion trap 6 they are caused to fragment into second generation fragment ions which are also trapped, accumulated or otherwise stored in upstream ion trap 6. In the final mode shown in FIG. 6E the ion source 1 remains OFF and the second generation fragment ions are ejected from the upstream ion trap 6 which is arranged to operate as an ion guide. The ions are then passed through the mass filter/analyser 2 which is arranged to be scanned so as to mass analyse the second generation fragment ions which are then transmitted by downstream ion trap 3 and detected by downstream ion detector 5.

Figure 6A:
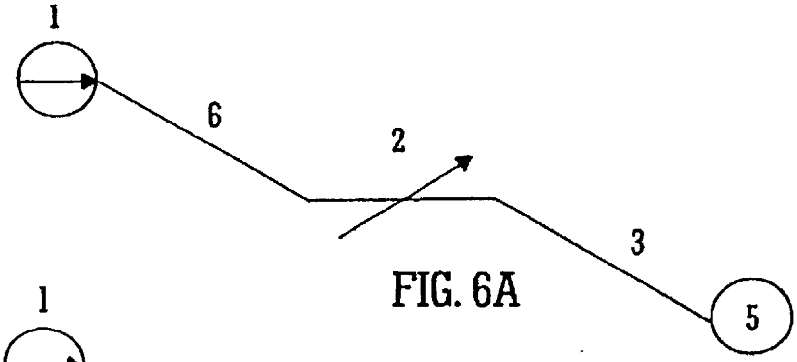
FIG. 6A illustrates a first mode of the fourth embodiment wherein parent ions are mass analysed.
Figure 6B:
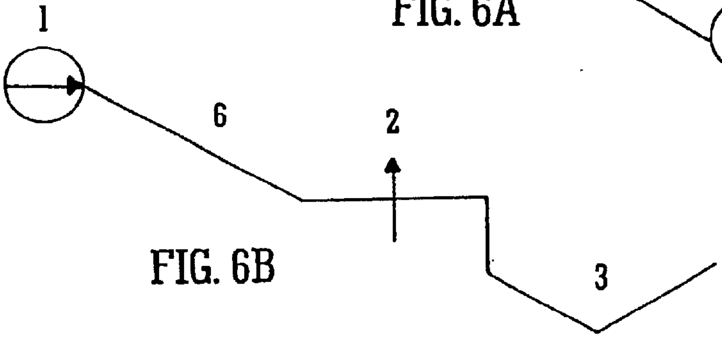
FIG. 6B illustrates a second mode wherein particular parent ion are selected, fragmented and stored in an ion trap.
Figure 6C:
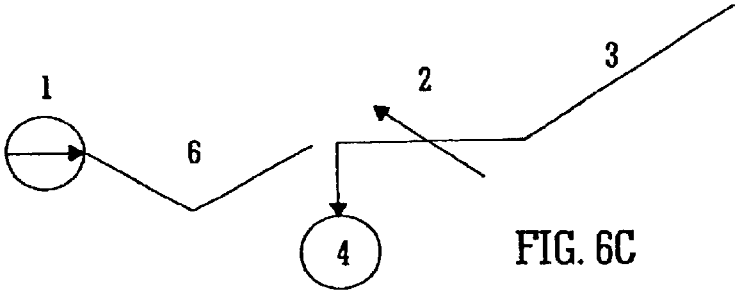
FIG. 6C illustrates a third mode wherein the fragment ions are passed back through the mass analyser for mass analysis whilst parent ions are accumulated in an upstream ion trap.
Figure 6D:
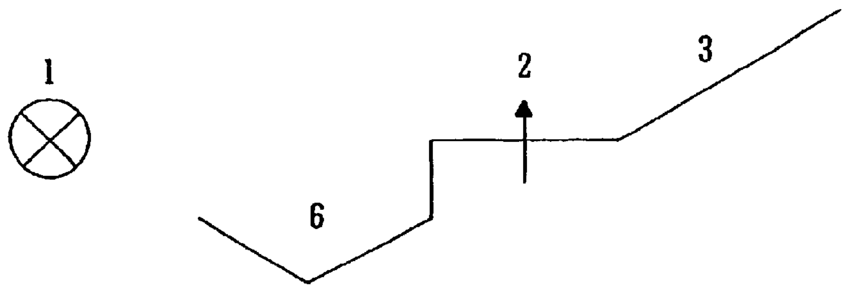
FIG. 6D illustrates a subsequent mode of operation wherein after further fragment ions have been stored in a downstream ion trap they are then passed through the mass filter to select particular fragment ions which are then further fragmented and stored in an upstream ion trap.
Figure 6E:
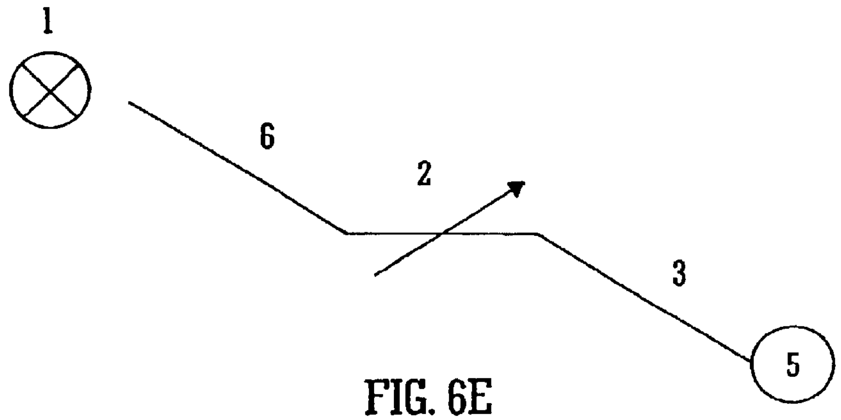
FIG. 6E illustrates a yet further mode wherein second generation fragment ions are passed back through the mass analyser for mass analysis.

Although not shown in FIGS. 6C and 6E Single Reaction Monitoring and Multiple Reaction Monitoring embodiments are contemplated wherein the mass filter/analyser 2 mass filters the fragment or second generation fragment ions rather than mass analysing them i.e. the mass filter/analyser 2 is set to transmit ions having a specific mass to charge ratio rather than being scanned.

The modes described above illustrate how a $MS^3$ experiment may be performed. The first and second modes are similar to the first and second modes of the MS/MS experiment according to the second embodiment. However, the third mode shows how ions are preferably accumulated in the upstream ion trap 6 whilst the fragment ions are being analysed by the scanning mass analyser 2 and off-axis upstream ion detector 4. Accumulating ions from the ion source 1 in the upstream ion trap 6 whilst the fragment ions are being mass analysed allows the overall duty cycle to be further improved. The fifth mode shown and described in relation to FIG. 6D shows how a fragment ion is selected by the mass filter 2 and fragmented and accumulated in the upstream ion trap 6. This is possible if the upstream ion trap 6 is operating at the correct pressure to act as a collision cell otherwise it may be used simply to accumulate fragment ions and then send them back to the downstream ion trap 3 for further fragmentation.

It can be seen from FIGS. 6D and 6E that during the fifth and sixth modes of operation the ion source 1 is switched OFF to prevent parent ions from the ion source appearing in the $MS^3$ mass spectrum. This embodiment does not therefore fully utilise 100% of the ions generated by the ion source 1.

Figure 1E:
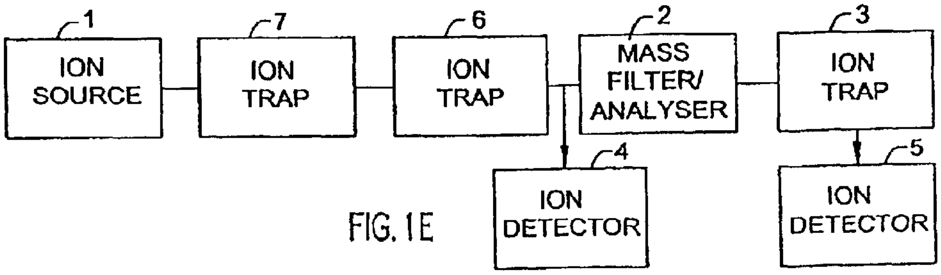
Figure 7:
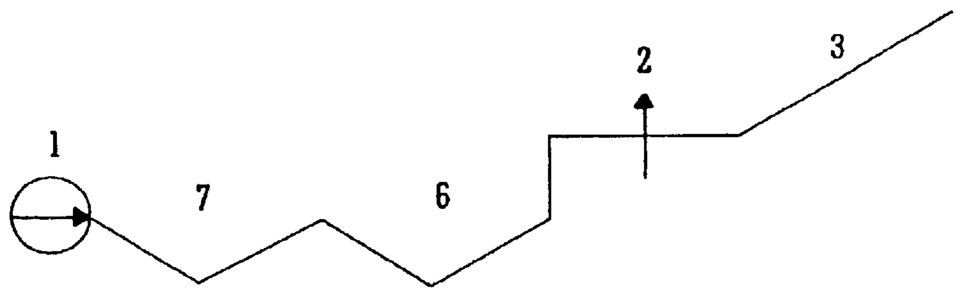
FIG. 7 illustrates a fifth embodiment of the present invention.

FIG. 1E illustrates a fifth and yet further embodiment of the present invention. The fifth embodiment is similar to the fourth embodiment except that an additional (second) upstream ion trap 7 is provided either upstream or downstream of the first upstream ion trap 6. The additional second upstream ion trap 7 allows all the ions generated by the ion source 1 to be used i.e. the ion source 1 does not need to be and preferably is not switched OFF whilst performing a $MS^3$ experiment. A general mode of operation is shown in FIG. 7 wherein ions are released from downstream ion trap 3 and are arranged to pass back upstream through the mass filter 2 which is arranged to operate in a narrow bandpass mode so that only ions falling within a specific narrow range of mass to charge ratios are transmitted by the mass filter 2. The ions are then arranged to have an energy and the upstream ion trap 6 is arranged to be maintained at a pressure such that the ions enter the upstream ion trap 6 and are caused to fragment into fragment ions which are also trapped, accumulated or otherwise stored in the upstream ion trap 6. Meanwhile, ions generated from the ion source 1 are accumulated in the further upstream ion trap 7.

According to a preferred embodiment the various modes according to the fifth embodiment may correspond with those according to the fourth embodiment except that preferably instead of switching the ion source 1 OFF in the fifth and sixth modes of the fourth embodiment (as shown in FIGS. 6D and 6E), the ion source 1 is preferably left ON and ions generated by the ion source 1 are trapped in the further upstream ion trap 7.

In the above described embodiments the upstream and/or downstream ion detector 4, 5 preferably comprise a detector per se. However, other less preferred embodiments are also contemplated wherein the upstream and/or downstream ion detectors 4, 5 may comprise the detector of a Time of Flight, a quadrupole, a Penning or Fourier Transform Ion Cyclotron Resonance mass analyser, a 2D or linear quadrupole ion trap or a Paul or 3D quadrupole ion trap i.e. an additional mass analyser may be provided.

It will be appreciated that the ion traps 3, 6, 7 are not necessarily ion tunnel ion traps/ion guides comprising a plurality of electrodes having apertures through which ions are transmitted and wherein substantially all the electrodes forming the ion tunnel ion trap/ion guide have substantially the same size apertures. Other forms of ion traps such as 2D linear quadrupole ion traps or Paul 3D quadrupole ion traps may also be used according to less preferred embodiments.

Similarly, although the mass filter/analyser 2 is preferably a quadrupole rod set mass filter/analyser, the mass filter/analyser could according to less preferred embodiment comprise an axial Time of Flight mass filter/analyser, a magnetic sector mass analyser, a Paul or 3D quadrupole type ion trap, a 2D linear quadrupole ion trap, a Wien filter or another type of mass filter/analyser.

Reference is made in the present application to the mass filter/analyser being operated in different modes. When the mass filter/analyser is the to be operated as a mass filter then unless otherwise stated it is intended that the mass filter transmits ions having a narrow (e.g. 1 amu) range of mass to charge ratios. Ions having other mass to charge ratios are substantially attenuated by the mass filter. When the mass filter is described as operating in a wide band pass mode then this is intended to mean that the mass filter does not substantially mass filter ions i.e. ions are transmitted by the mass filter irrespective of their mass to charge ratio. Finally, when the mass filter/analyser is described as operating as a mass analyser, this is intended to mean that a narrow (e.g. 1 amu) mass to charge ratio transmission window of the mass filter/analyser is rapidly scanned.

In all the embodiments described above an axial DC voltage gradient or other means for urging ions through the mass spectrometer may or may not be provided. For example, according to less preferred embodiments when an ion trap is arranged to eject ions no axial DC voltage gradient may be provided along the length of the ion trap so that ions drift out of the ion trap but are not substantially accelerated out of the ion trap. Similarly, it will be appreciated that axial DC voltage gradients applied to one or more of the ion traps may be varied along the length of the ion trap and may vary in a time dependent manner.

Although the present invention has been described with reference to preferred embodiments, it will be understood by those skilled in the art that various changes in form and detail may be made without departing from the scope of the invention as set forth in the accompanying claims.

What is claimed is:

1. A mass spectrometer comprising:

an ion source;

a mass filter/analyser arranged downstream of said ion source;

an upstream ion trap;

an upstream ion detector arranged upstream of said mass filter/mass analyser; and a downstream ion trap arranged downstream of both said mass filter/analyser and said upstream ion trap.

2. A mass spectrometer as claimed in claim 1, wherein in a mode of operation said mass filter is operated in a wide band pass mode so as to transmit substantially all ions and said downstream ion trap is arranged to accumulate ions.

3. A mass spectrometer as claimed in claim 2, wherein in a mode of operation said downstream ion trap releases said ions and wherein at least some of said ions are passed back upstream through said mass filter/analyser which is arranged to mass analyse said ions and wherein said ions are detected by said upstream ion detector.

4. A mass spectrometer as claimed in claim 1, wherein in a mode of operation said mass filter/analyser is arranged to mass filter ions emitted from said ion source so that only ions having a specific mass to charge ratio are onwardly transmitted and ions having other mass to charge ratios are attenuated by said mass filter and wherein ions onwardly transmitted by said mass filter are arranged to be substantially fragmented and wherein fragment ions are arranged to be accumulated in said downstream ion trap.

5. A mass spectrometer as claimed in claim 4, wherein in a mode of operation said downstream ion trap releases said fragment ions and wherein at least some of said fragment ions are passed back upstream through said mass filter/analyser which is arranged to mass analyse said fragment ions and wherein said fragment ions are detected by said upstream ion detector.

6. A mass spectrometer as claimed in claim 4, wherein in a mode of operation said downstream ion trap releases said fragment ions and wherein at least some of said fragment ions are passed back upstream through said mass filter/analyser which is arranged to mass filter said fragment ions so that fragment ions having a specific mass to charge ratio are onwardly transmitted and fragment ions having other mass to charge ratios are attenuated by said mass filter and wherein said fragment ions transmitted by said mass filter are detected by said upstream ion detector.

7. A mass spectrometer as claimed in claim 1, further comprising a downstream ion detector arranged downstream of said downstream ion trap.

8. A mass spectrometer as claimed in claim 7, wherein in a mode of operation said mass filter/analyser is arranged to mass analyse ions emitted from said ion source and wherein said ions are detected by said downstream ion detector.

9. A mass spectrometer as claimed in claim 7, wherein in a mode of operation said mass filter/analyser is arranged to mass filter ions emitted from said ion source so that ions having a specific mass to charge ratio are onwardly transmitted and ions having other mass to charge ratios are attenuated by said mass filter and wherein ions onwardly transmitted by said mass filter are arranged to be substantially fragmented and wherein fragment ions are arranged to be accumulated in said downstream ion trap.

10. A mass spectrometer as claimed in claim 9, wherein in a mode of operation said downstream ion trap releases said fragment ions and wherein at least some of said fragment ions are passed back upstream through said mass filter/analyser which is arranged to mass analyse or mass filter said fragment ions, wherein said fragment ions are detected by said upstream ion detector.

11. A mass spectrometer as claimed in claim 7, wherein the upstream ion trap is arranged upstream of said mass filter/analyser.

12. A mass spectrometer as claimed in claim 11, wherein in a mode of operation said mass filter/analyser is arranged to mass analyse ions emitted from said ion source and wherein said ions are detected by said downstream ion detector.

13. A mass spectrometer as claimed in claim 11, wherein in a mode of operation said mass filter/analyser is arranged to mass filter ions emitted from said ion source so that ions having a specific mass to charge ratio are onwardly transmitted and ions having other mass to charge ratios are attenuated by said mass filter and wherein ions onwardly transmitted by said mass filter are arranged to be substantially fragmented and wherein fragment ions are arranged to be accumulated in said downstream ion trap.

14. A mass spectrometer as claimed in claim 13, wherein in a mode of operation said downstream ion trap releases said fragment ions and wherein at least some of said fragment ions are passed back upstream through said mass filter/analyser which is arranged to mass analyse or mass filter said fragment ions and wherein said ions are detected by said upstream ion detector.

15. A mass spectrometer as claimed in claim 14, wherein ions emitted from said ion source are substantially simultaneously accumulated in said upstream ion trap whilst said fragment ions are being mass analysed.

16. A mass spectrometer as claimed in claim 14, wherein in a further mode of operation said mass filter/analyser is arranged to mass filter ions emitted from said ion source so that ions having a specific mass to charge ratio are onwardly transmitted and ions having other mass to charge ratios are attenuated by said mass filter and wherein ions onwardly transmitted by said mass filter are arranged to be substantially fragmented and wherein fragment ions are arranged to be accumulated in said downstream ion trap.

17. A mass spectrometer as claimed in claim 16, wherein in said further mode of operation said mass filter/analyser also mass filters ions which have been previously accumulated in said upstream ion trap.

18. A mass spectrometer as claimed in claim 16, wherein in a mode of operation said downstream ion trap releases said fragment ions and wherein at least some of said fragment ions are passed back upstream through said mass filter/analyser which is arranged to mass filter said fragment ions so that fragment ions having a specific mass to charge ratio are onwardly transmitted and fragment ions having other mass to charge ratios are attenuated by said mass filter and wherein fragment ions onwardly transmitted by said mass filter are arranged to be substantially further fragmented to form second generation fragment ions and wherein said second generation fragment ions are arranged to be accumulated in said upstream ion trap.

19. A mass spectrometer as claimed in claim 18, wherein in a mode of operation said upstream ion trap is arranged to release said second generation fragment ions and wherein said mass filter/analyser is arranged to mass analyse or mass filter said second generation fragment ions and wherein said second generation fragment ions are detected by said downstream ion detector.

20. A mass spectrometer as claimed in claim 11, further comprising a second upstream ion trap arranged upstream of said upstream ion trap.

21. A mass spectrometer as claimed in claim 20, wherein in a mode of operation said downstream ion trap releases fragment ions and wherein at least some of said fragment ions are passed back upstream through said mass filter/analyser which is arranged to mass filter said fragment ions so that fragment ions having a specific mass to charge ratio are onwardly transmitted and fragment ions having other mass to charge ratios are attenuated by said mass filter and wherein fragment ions onwardly transmitted by said mass filter are arranged to be substantially further fragmented to form second generation fragment ions and wherein said second generation fragment ions are arranged to be accumulated in said upstream ion trap and wherein ions emitted from said ion source are substantially simultaneously accumulated in said second upstream ion trap whilst said fragment ions are being mass filtered by said mass filter.

22. A mass spectrometer as claimed in claim 21, wherein in a mode of operation said upstream ion trap is arranged to release said second generation fragment ions and wherein said mass filter/analyser is arranged to mass analyse or mass filter said second generation fragment ions and wherein said second generation fragment ions are detected by said downstream ion detector and wherein ions emitted from said ion source are substantially simultaneously accumulated in said second upstream ion trap whilst said second generation fragment ions are being mass analysed or mass filtered by said mass filter/analyser.

23. A mass spectrometer comprising:

an ion source;

a mass filter/analyser;

an upstream ion trap arranged upstream of said mass filter/analyser;

a downstream ion trap arranged downstream of said mass filter/analyser; and a downstream ion detector arranged downstream of said downstream ion trap;

wherein said mass filter/analyser is arranged to mass filter ions emitted from said ion source so that ions having a specific mass to charge ratio are onwardly transmitted and ions having other mass to charge ratios are attenuated by said mass filter and wherein ions onwardly transmitted by said mass filter are arranged to be substantially fragmented and wherein said fragment ions are arranged to be accumulated in said downstream ion trap, wherein said downstream ion trap then releases said fragment ions and at least some of said fragment ions are passed back upstream through said mass filter/analyser which is operated in a wide band pass mode so as to transmit substantially all said fragment ions wherein said fragment ions are arranged to be accumulated in said upstream ion trap, wherein said upstream ion trap then releases said fragment ions and at least some of said fragment ions are passed through said mass filter/analyser which is arranged to mass analyse or mass filter said fragment ions and wherein said fragment ions are transmitted by said downstream ion trap without said ions being substantially fragmented and are then detected by said downstream ion detector.

24. A mass spectrometer as claimed in claim 23, wherein said ion source is selected from the group consisting of: (i) Electrospray ("ESI") ion source; (ii) Atmospheric Pressure Chemical Ionisation ("APCI") ion source; (iii) Atmospheric Pressure Photo Ionisation ("APPI") ion source; (iv) Matrix Assisted Laser Desorption Ionisation ("MALDI") ion source; (v) Laser Desorption Ionisation ("LDI") ion source; (vi) Inductively Coupled Plasma ("ICP") ion source; (vii) Electron Impact ("EI") ion source; (viii) Chemical Ionisation ("CI") ion source; (ix) a Fast Atom Bombardment ("FAB") ion source; and (x) a Liquid Secondary Ions Mass Spectrometry ("LSIMS") ion source.

25. A mass spectrometer as claimed in claim 23, wherein when ions are arranged to be fragmented at least 50%, 60%, 70%, 80%, 90% or 95% of the ions enter either said downstream ion trap and/or said upstream ion trap with an energy greater than or equal to 10 eV for a singly charged ion or greater than or equal to 20 eV for a doubly charged ion such that said ions are caused to fragment.

26. A mass spectrometer as claimed in claim 23, wherein said downstream ion trap and/or said upstream ion trap and/or said second upstream ion trap are maintained in use at a pressure selected from the group consisting of: (i) greater than or equal to 0.0001 mbar; (ii) greater than or equal to 0.0005 mbar; (iii) greater than or equal to 0.001 mbar; (iv) greater than or equal to 0.005 mbar; (v) greater than or equal to 0.01 mbar; (vi) greater than or equal to 0.05 mbar; (vii) greater than or equal to 0.1 mbar; (viii) greater than or equal to 0.5 mbar; (ix) greater than or equal to 1 mbar; (x) greater than or equal to 5 mbar; and (xi) greater than or equal to 10 mbar.

27. A mass spectrometer as claimed in claim 23, wherein said downstream ion trap and/or said upstream ion trap and/or said second upstream ion trap is maintained in use at a pressure selected from the group consisting of: (i) less than or equal to 10 mbar; (ii) less than or equal to 5 mbar; (iii) less than or equal to 1 mbar; (iv) less than or equal to 0.5 mbar; (v) less than or equal to 0.1 mbar; (vi) less than or equal to 0.05 mbar; (vii) less than or equal to 0.01 mbar; (viii) less than or equal to 0.005 mbar; (ix) less than or equal to 0.001 mbar; (x) less than or equal to 0.0005 mbar; and (xi) less than or equal to 0.0001 mbar.

28. A mass spectrometer as claimed in claim 23, wherein said downstream ion trap and/or said upstream ion trap and/or said second upstream ion trap is maintained in use at a pressure selected from the group consisting of: (i) between 0.0001 and 10 mbar; (ii) between 0.0001 and 1 mbar; (iii) between 0.0001 and 0.1 mbar; (iv) between 0.0001 and 0.01 mbar; (v) between 0.0001 and 0.001 mbar; (vi) between 0.001 and 10 mbar; (vii) between 0.001 and 1 mbar; (viii) between 0.001 and 0.1 mbar; (ix) between 0.001 and 0.01 mbar; (x) between 0.01 and 10 mbar; (xi) between 0.01 and 1 mbar; (xii) between 0.01 and 0.1 mbar; (xiii) between 0.1 and 10 mbar; (xiv) between 0.1 and 1 mbar; and (xv) between 1 and 10 mbar.

29. A mass spectrometer as claimed in claim 23, wherein said downstream ion trap and/or said upstream ion trap and/or said second upstream ion trap are selected from the group consisting of: (i) an ion funnel comprising a plurality of electrodes having apertures therein through which ions are transmitted, wherein the diameter of said apertures becomes progressively smaller or larger; (ii) an ion tunnel comprising a plurality of electrodes having apertures therein through which ions are transmitted, wherein the diameter of said apertures remains substantially constant; and (iii) a stack of plate, ring or wire loop electrodes.

30. A mass spectrometer as claimed in claim 29, wherein each electrode has a substantially circular aperture.

31. A mass spectrometer as claimed in claim 23, wherein said downstream ion trap and/or said upstream ion trap and/or said second upstream ion trap comprise a plurality of electrodes, each electrode having an aperture through which ions are transmitted in use.

32. A mass spectrometer as claimed in claim 31, wherein the diameter of the apertures of at least 50%, 60%, 70%, 80%, 90% or 95% of the electrodes forming said wherein said downstream ion trap and/or said upstream ion trap and/or said second upstream ion trap are selected from the group consisting of: (i) less than or equal to 10 mm; (ii) less than or equal to 9 mm; (iii) less than or equal to 8 mm; (iv) less than or equal to 7 mm; (v) less than or equal to 6 mm; (vi) less than or equal to 5 mm; (vii) less than or equal to 4 mm; (viii) less than or equal to 3 mm; (ix) less than or equal to 2 mm; and (x) less than or equal to 1 mm.

33. A mass spectrometer as claimed in claim 31, wherein at least 50%, 60%, 70%, 80%, 90% or 95% of the electrodes forming said downstream ion trap and/or said upstream ion trap and/or said second upstream ion trap have apertures which are substantially the same size or area.

34. A mass spectrometer as claimed in claim 31, wherein the thickness of at least 50%, 60%, 70%, 80%, 90% or 95% of said electrodes is selected from the group consisting of: (i) less than or equal to 3 mm; (ii) less than or equal to 2.5 mm; (iii) less than or equal to 2.0 mm; (iv) less than or equal to 1.5 mm; (v) less than or equal to 1.0 mm; and (vi) less than or equal to 0.5 mm.

35. A mass spectrometer as claimed in claim 31, wherein at least 10%, 20%, 30%, 40%, 50%, 60%, 70%, 80%, 90%, or 95% of said electrodes are connected to both a DC and an AC or RF voltage supply.

36. A mass spectrometer as claimed in claim 31, wherein axially adjacent electrodes are supplied with AC or RF voltages having a phase difference of 180°.

37. A mass spectrometer as claimed in claim 23, wherein said downstream ion trap and/or said upstream ion trap and/or said second upstream ion trap is selected from the group consisting of: (i) 10–20 electrodes; (ii) 20–30 electrodes; (iii) 30–40 electrodes; (iv) 40–50 electrodes; (v) 50–60 electrodes; (vi) 60–70 electrodes; (vii) 70–80 electrodes; (viii) 80–90 electrodes; (ix) 90–100 electrodes; (x) 100–110 electrodes; (xi) 110–120 electrodes; (xii) 120–130 electrodes; (xiii) 130–140 electrodes; (xiv) 140–150 electrodes; or (xv) more than 150 electrodes.

38. A mass spectrometer as claimed in claim 23, wherein said downstream ion trap and/or said upstream ion trap and/or said second upstream ion trap has a length selected from the group consisting of: (i) less than 5 cm; (ii) 5–10 cm; (iii) 10–15 cm; (iv) 15–20 cm; (v) 20–25 cm; (vi) 25–30 cm; and (vii) greater than 30 cm.

39. A mass spectrometer as claimed in claim 23, wherein said downstream ion trap and/or said upstream ion trap and/or said second upstream ion trap comprise a segmented rod set.

40. A mass spectrometer as claimed in claim 23, wherein said downstream ion trap and/or said upstream ion trap and/or said second upstream ion trap comprise a housing having an upstream opening for allowing ions to enter said downstream ion trap and/or said upstream ion trap and/or said second upstream ion trap and a downstream opening for allowing ions to exit said downstream ion trap and/or said upstream ion trap and/or said second upstream ion trap.

41. A mass spectrometer as claimed in claim 40, wherein said downstream ion trap and/or said upstream ion trap and/or said second upstream ion trap further comprise an inlet port through which a collision gas is introduced.

42. A mass spectrometer as claimed in claim 41, wherein said collision gas comprises air and/or one or more inert gases and/or one or more non-inert gases.

43. A mass spectrometer as claimed in claim 23, wherein said upstream ion detector and/or said downstream ion detector are selected from the group consisting of: (i) a Micro Channel Plate ("MCP") ion detector; (ii) an electron-multiplier ion detector; and (iii) a phosphor or scintillator in conjunction with a photo-multiplier ion detector.

44. A mass spectrometer as claimed in claim 23, wherein said downstream ion detector and/or said upstream ion detector form part of a further mass analyser, said further mass analyser selected from the group consisting of: (i) a Time of Flight mass analyser; (ii) a quadrupole mass analyser; (iii) a Penning or Fourier Transform Ion Cyclotron Resonance ("FTICR") mass analyser; (iv) a 2D or linear quadrupole ion trap; and (v) a Paul or 3D quadrupole ion trap.

45. A mass spectrometer as claimed in claim 23, wherein said downstream ion trap and/or said upstream ion trap and/or said second upstream ion trap may be operated in one of more of the following modes: (i) an ion trapping mode wherein one or more trapping voltages are applied to prevent ions from exiting from one or more ends of said ion trap; (ii) an ion guide mode wherein no trapping voltages are applied and hence all ions received by said ion trap are substantially onwardly transmitted by said ion trap; (iii) a fragmentation mode wherein the ion trap is arranged to be maintained at a pressure and/or ions are arranged to enter the ion trap with an energy such that the ions are substantially fragmented within the ion trap; and (iv) an ion trapping and fragmentation mode wherein one or more trapping voltages are applied to prevent ions from exiting from one or more ends of said ion trap and wherein the ion trap is arranged to be maintained at a pressure and/or ions are arranged to enter the ion trap with an energy such that the ions are substantially fragmented within the ion trap.

46. A mass spectrometer as claimed in claim 23, wherein said mass filter/analyser is selected from the group consisting of: (i) a quadrupole rod set mass filter/analyser; (ii) a magnetic sector mass analyser; and (iii) a Time of Flight mass analyser.

47. A method of mass spectrometry, comprising:

providing an ion source, a mass filter/analyser arranged downstream of said ion source, an upstream ion trap, an upstream ion detector arranged upstream of said mass filter/mass analyser and a downstream ion trap arranged downstream of both said mass filter/analyser; and said upstream ion trap;

trapping parent or fragment ions in said downstream ion trap;

ejecting said parent or fragment ions from said downstream ion trap and passing said parent or fragment ions through said mass filter/analyser;

mass analysing or mass filtering said parent or fragment ions; and detecting said ions with said upstream ion detector.

48. A method as claimed in claim 47, further comprising trapping ions generated from said ion source in said upstream ion trap whilst fragment ions are being mass analysed or mass filtered.

49. A method of mass spectrometry, comprising:

providing an ion source, a mass filter/analyser arranged downstream of said ion source, an upstream ion detector arranged upstream of said mass filter/mass analyser, an upstream ion trap arranged upstream of said mass filter/analyser, a second upstream ion trap arranged upstream of said upstream ion trap and a downstream ion trap arranged downstream of said mass filter/analyser;

trapping fragment ions in said downstream ion trap;

ejecting said fragment ions from said downstream ion trap and passing said fragment ions through said mass filter/analyser;

mass filtering said fragment ions so that fragment ions having a specific mass to charge ratio are onwardly transmitted and ions having other mass to charge ratios are attenuated by said mass filter;

further fragmenting said fragment ions onwardly transmitted by said mass filter to form second generation fragment ions; and accumulating said second generation fragment ions in said upstream ion trap.

50. A method as claimed in claim 49, further comprising trapping ions generated from said ion source in said second upstream ion trap whilst fragment ions are being mass filtered.

51. A method as claimed in claim 49, further comprising:

ejecting said second generation fragment ions from said upstream ion trap and passing said second generation fragment ions through said mass filter/analyser;

mass analysing or mass filtering said second generation fragment ions; and detecting said ions with said downstream ion detector.

52. A method as claimed in claim 51, further comprising trapping ions generated from said ion source in said second upstream ion trap whilst said second generation fragment ions are being mass analysed.

53. A method of mass spectrometry, comprising:

providing an ion source, a mass filter/analyser arranged downstream of said ion source, a upstream ion trap, an upstream ion detector arranged upstream of said mass filter/mass analyser and a downstream ion trap arranged downstream of both said mass filter/analyser; and said upstream ion trap;

trapping fragment ions in said downstream ion trap;

ejecting said fragment ions from said downstream ion trap and passing said fragment ions through said mass filter/analyser;

mass filtering said fragment ions so that fragment ions having a specific mass to charge ratio are onwardly transmitted and ions having other mass to charge ratios are attenuated by said mass filter; and detecting said ions with said upstream ion detector.

54. A method of mass spectrometry, comprising:

providing an ion source, a mass filter/analyser arranged downstream of said ion source, an upstream ion trap arranged upstream of said mass filter/mass analyser, a downstream ion trap arranged downstream of said mass filter/analyser, and a downstream ion detector arranged downstream of said downstream ion trap;

arranging said mass filter/analyser to mass filter ions emitted from said ion source so that ions having a specific mass to charge ratio are onwardly transmitted and ions having other mass to charge ratios are substantially attenuated by said mass filter;

fragmenting said ions onwardly transmitted by said mass filter;

accumulating said fragment ions in said downstream ion trap;

releasing said fragment ions from said downstream ion trap;

passing at least some of said fragment ions back upstream through said mass filter/analyser which is operated in a wide band pass mode so as to transmit substantially all said fragment ions wherein said fragment ions are arranged to be accumulated in said upstream ion trap;

releasing said fragment ions from said upstream ion trap;

passing at least some of said fragment ions through said mass filter/analyser which is arranged to mass analyse or mass filter said fragment ions;

transmitting said fragment ions through said downstream ion trap without said fragment ions being substantially further fragmented; and detecting said ions with said downstream ion detector.

* * * * *